United States Patent [19]

Slough et al.

[11] 4,237,613
[45] Dec. 9, 1980

[54] SHAFT BEARING WEAR MEASURING APPARATUS

[75] Inventors: Carlton M. Slough, Spring, Tex.; Wendell W. Dedman, Darien, Conn.

[73] Assignee: Texaco Inc., White Plains, N.Y.

[21] Appl. No.: 1,247

[22] Filed: Jan. 5, 1979

Related U.S. Application Data

[63] Continuation of Ser. No. 883,607, Mar. 6, 1978, abandoned, which is a continuation of Ser. No. 745,262, Nov. 26, 1976, abandoned.

[51] Int. Cl.³ .......................... G01B 7/02; G01B 7/31
[52] U.S. Cl. .............................. 33/172 E; 33/169 R; 33/174 Q; 33/178 E
[58] Field of Search ............ 33/172 E, 178 R, 174 P, 33/178 E, 169 R, DIG. 17, 174 Q; 73/105

[56] References Cited

U.S. PATENT DOCUMENTS

| | | | |
|---|---|---|---|
| 2,408,672 | 10/1946 | Mennesson | 33/178 D |
| 2,448,314 | 8/1948 | Kavanagh | 33/DIG. 17 |

FOREIGN PATENT DOCUMENTS 443720  2/1968  Switzerland ........................... 33/178 C Primary Examiner—Willis Little
Attorney, Agent, or Firm—Carl G. Ries; Ronald G. Gillespie

[57] ABSTRACT

Apparatus for measuring the wear of a shaft bearing includes a liquid, a source of fluid, a valve, sight gage and a transducer. The transducer has a probe which may be urged against the shaft by admitting fluid from the source to a chamber in the transducer. The liquid is in enclosed subsystem comprising the sight gage, an expandable chamber in the transducer and a connecting line. As the probe is urged against the shaft, the expandable chamber expands in a relationship to the movement of the probe. More liquid enters the expandable chamber, causing a corresponding decrease of liquid in the sight gage which is measurable. Upon completion, the fluid is vented, which allows the probe to return to a rest position.

13 Claims, 2 Drawing Figures

SHAFT BEARING WEAR MEASURING APPARATUS

This is a continuation, of application Ser. No. 883,607, filed Mar. 6, 1978, which is a continuation of an application Ser. No. 745,262, filed Nov. 26, 1976 now abandoned.

BACKGROUND OF THE INVENTION

Field of the Invention

The present invention relates to measuring apparatus in general and, more particularly, to shaft bearing measuring apparatus.

SUMMARY OF THE INVENTION

Apparatus for measuring the wear of a bearing associated with a shaft includes a probe which is normally at a reference position. The probe during measurement is moved in the direction of the shaft until it is stopped by the surface. The travel distance of the probe is measured. Changes in the travel distance correspond to bearing wear.

The objects and advantages of the invention will appear more fully hereinafter, from a consideration of the detailed description which follows, taken together with the accompanying drawings wherein one embodiment is illustrated by way of example. It is to be expressly understood, however, that the drawings are for illustrative purposes only and are not to be construed as defining the limits of the invention.

DESCRIPTION OF THE INVENTION

Figure 1:
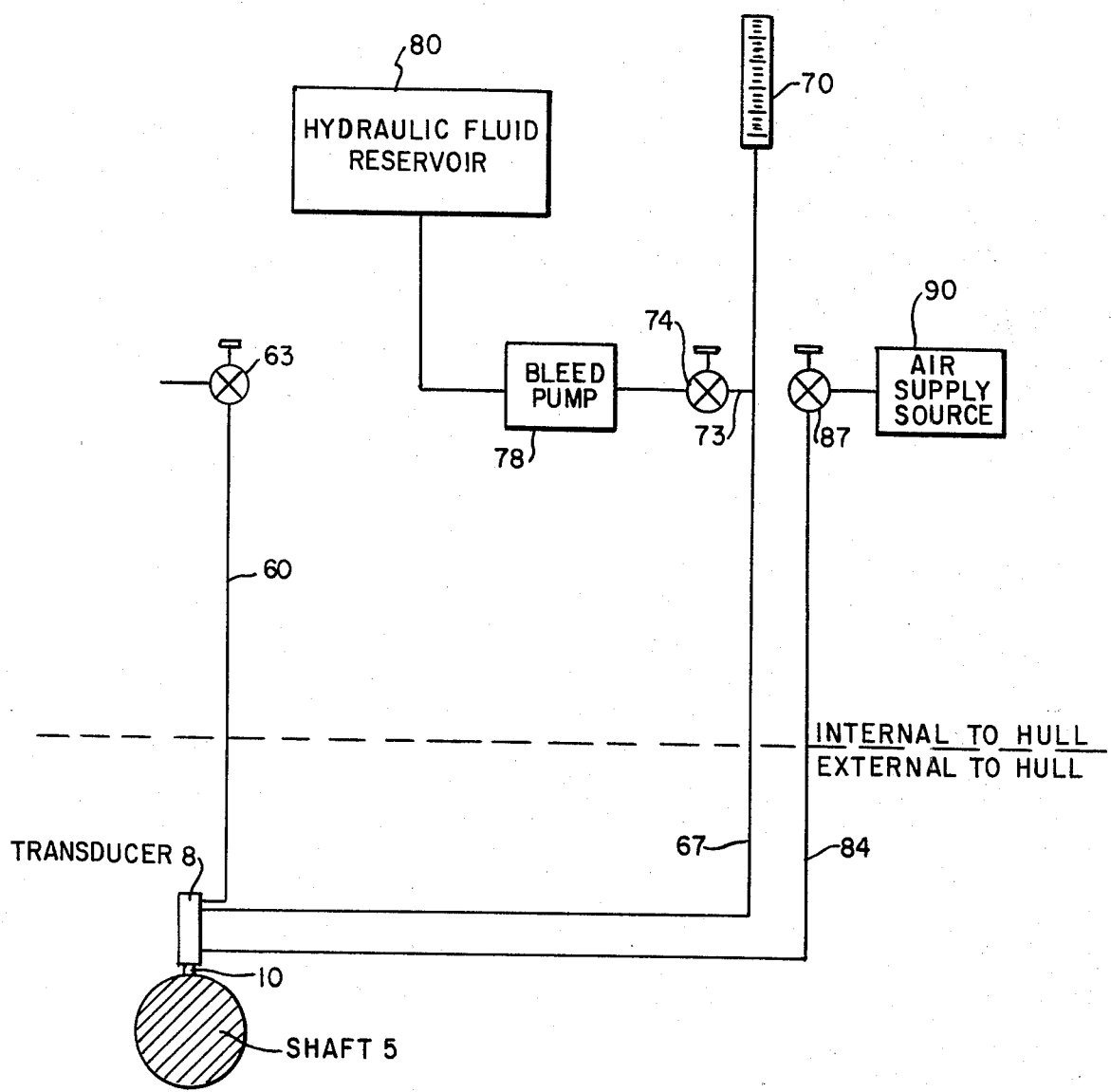
FIG. 1 is a simplified block diagram of a system constructed in accordance with the present invention for measuring the wear of a shaft bearing.
Figure 2:
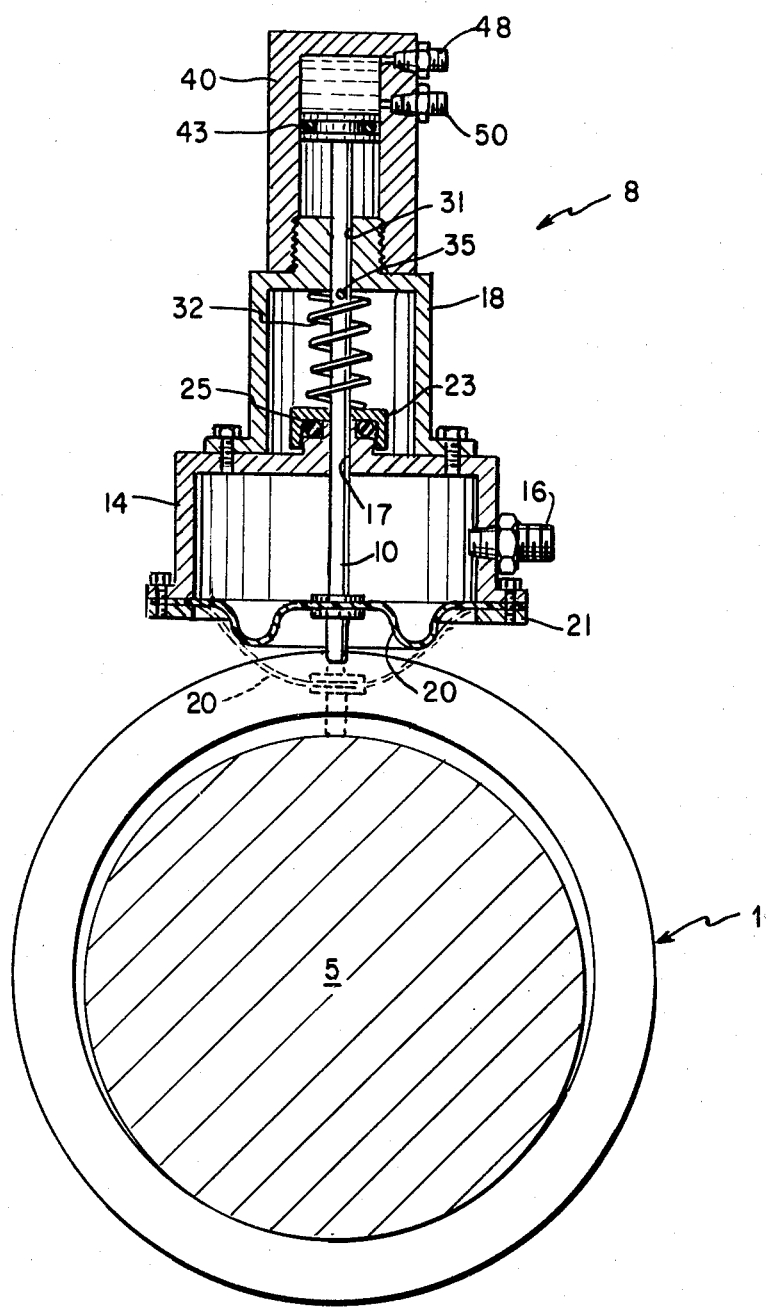
FIG. 2 is a detailed drawing of the transducer shown in FIG. 1.

The wear of a shaft bearing for a ship's propeller shaft may be determined, without removal of the bearing or the shaft. Referring now to FIGS. 1 and 2, a shaft bearing 1, which is external to the hull of a ship, has a propeller shaft 5 resting on its inner surface. Suitable affixed to the outside of the ship and having access to shaft 5 is a transducer 8.

Transducer 8 comprises a movable contact probe 10, an air chamber housing 14 with a conventional type air port fitting 16, and a top opening 17 in which probe 10 is present, a flexible diaphragm 20, affixed to probe 10 and secured to housing 14 by a bezel ring 21, which in part controls the movement of probe 10. A collar 23 is attached to housing 14 around opening 17 so as to compress a seal 25 to seal off the inside of housing 14 while permitting movement of probe 10.

An open bottom spring housing 18 having a top opening 31 is mounted on the top of air chamber housing 14. A return spring 32 is placed around probe 10 having one end in contact with collar 23 and its other end in contact with a pin 35 inserted in probe 10. The size of pin 35 and spring 32 is such that they cannot enter opening 31. Spring 32 in part controls the movement of probe 10.

An hydraulic housing 40 is affixed to spring housing 18 so that a portion of the top of housing 18 forms the bottom for housing 31. Probe 10 protrudes inside of housing 40 and has a head 43 with an O-ring type seal 44 positioned so as to seal off a lower portion of a chamber formed by housings 18 and 40 from an upper portion of the chamber formed by housings 18 and 40.

Housing 40 has two ports in which are inserted conventional type fittings, referred to as bleed line fitting 48 and sight gage line fitting 50. The location of the two ports is such that, in its travel into housing 40, head 43 on probe 10 does not pass a port and that the ports are always in the upper portion of the chamber formed by housings 18 and 40.

A line 60 connects bleeder line fitting 48 to a bleed valve 63. A line 67 connects sight gage line fitting 50 to a premarked and calibrated sight gage 70 located internal to the hull of the ship. Connected to line 67 is another line 73 having a valve 74 and a bleed pump 78. Bleed pump 78 is connected to a reservoir or a source 80 of hydraulic fluid by a line 81.

An air line 84 is connected to air port fitting 16 and to a multiport valve 87 which is connected to an air supply source 90 by way of a line 91. Valve 87 may be operated to either pass air from source 90 to transducer 8 or to block the air from source 90 while venting any air in transducer 8.

Bleed valve 63, sight gage 70, valve 74, pump 78, reservoir or source 80, valve 87 and air supply source 90 are located internally in the ship.

OPERATION

To make a measurement, valve 87 is operated by an operator to pass air from source 90 through line 84 and fitting 16 into housing 14. As the air pressure in housing 14 increases, diaphragm 20 is flexed so as to urge probe 10 into contact with shaft 5. Thus, the distance of travel by probe 10 is directly related to the displacement of shaft 5. As the inner surface of bearing 1 wears, the travel distance of probe 10 increases.

As probe 10 is urged against shaft 5, its movement compresses return spring 32 and increases the volume of the upper portion of the chamber formed by housings 18 and 40. A quantity of hydraulic fluid wich was in the upper portion of the chamber formed by housings 18 and 40, line 67 and sight gage 70 is redistributed by the movement of probe 10 so that a decrease in the level of fluid in the sight gage in effect measures the travel distance of probe 10. A resulting position of probe 10 and diaphragm 20 is indicated by dashed lines in FIG. 2.

After the measurement has been recorded by the operator, the operator activates valve 87 to block the air from source 90 and to vent the air in transducer 8. Return spring 32 forces probe 10 back to its original position, causing the fluid in the sight tube to return to its original position.

Reservoir or source 80, with pump 78, provides fluid for bleeding the lines as well as fluid compensation for temperature change. Valve 63 is operated during the bleeding of the system as well as to release fluid for temperature compensation.

Although the present invention is shown utilizing a liquid for the measurement in conjection with a fluid, such as air, for urging the probe against the shaft, another embodiment (not shown) has the liquid serving two functions while it is in one chamber, that of measurement and that of urging the probe against the shaft. Thus, the hydraulic fluid may be pumped into the upper portion of the chamber formed by housings 18 and 40 to urge probe 10 against shaft 5 and the quantity of hydraulic fluid pumped into the upper portion of the chamber may be measured.

The system and method as hereinbefore described measure the wear of a shaft bearing.

What is claimed is:

1. In combination, a ship's propeller shaft bearing having a rotatable propeller shaft resting on its inner surface, and an on line apparatus for measuring the wear of a ship's propeller shaft bearing, said apparatus comprising determining means for determining the displacement of the ship's propeller shaft in the direction of a contact surface of the shaft bearing, and means for providing a measurement of the shaft bearing wear in accordance with the determined shaft displacement.

2. The combination as described in claim 1 in which the determining means includes a movable member at a reference position, and means connected to the member for moving the member until the member makes contact with the shaft; and the measurement means includes means for measuring the travel distance of the member from the reference position until the member is stopped by the shaft.

3. The combination as described in claim 2 further comprising means connected to the member for returning the member to the reference position.

4. The combination as described in claim 3 in which the moving means includes a bottomless housing affixed to the shaft bearing having a sealed upper opening through which the member passes and a port through which a fluid may enter or exit; a bezel ring, a diaphragm affixed to said member and between said housing and bezel ring forming thereby an expandable chamber the diaphragm is distended in the direction of the shaft, moving the member into contact with the shaft, a supply of liquid, and manual operative means connected to the port in the first housing and to the fluid supply for providing fluid from said supply and for releasing fluid from the expandable chamber.

5. The combination as described in claim 4 further comprising a pin inserted into the member and in which the returning means includes a second housing mounted on the first housing and having the movable member extending through it, and a return spring arranged with the member and between the pin and the first housing so that as the member is moved towards the shaft by the diaphragm the spring is compressed and so that the spring returns the member to the reference position.

6. The combination as described in claim 5 in which the measuring means includes a third housing having an opening, through which a liquid may enter or exit, mounted on said second housing, in such manner so as to form a fixed chamber and so that the movable member extends into the fixed chamber, a head element affixed to the member, seal means affixed to the head element and contacting the sides of the third housing so as to seal off a lower portion of the fixed chamber from an upper portion of the fixed chamber, for allowing liquid to enter the upper portion of the fixed chamber without entering the lower portion of the fixed chamber, a sight gage, a line connecting the opening in the third housing to the sight gage, and a predetermined quantity of liquid in the upper portion of the fixed chamber, in the line and in the sight gage so that as the member moves the level of the liquid in the sight gage changes accordingly.

7. The combination as described in claim 6 in which the third housing has a second opening from the upper portion of the fixed chamber through the housing, and further comprising means connected to the second opening in the third housing and to the line for bleeding the liquid in the measuring means.

8. The combination as described in claim 3 in which the measuring means includes a sight gage; the return means includes a first housing affixed to the shaft bearing, and having the movable member extending through it; and the moving means includes a second housing having an opening through which a liquid may enter or exit, mounted on said first housing in such manner so as to form a fixed chamber and so that the movable member extends into the fixed chamber, a head element affixed to the member, seal means affixed to the head element and contacting the sides of the second housing so as to seal off a lower portion of the fixed chamber, for allowing a liquid to enter the upper portion of the fixed chamber without entering the lower portion of the fixed chamber, a line connecting the opening in the third housing to the sight gage, a predetermined quantity of liquid in the upper portion of the fixed chamber, in the line and in the sight gage, and means for forcing liquid from the sight gage into the upper additional portion of the fixed chamber so as to move the movable member against the shaft while substantially simultaneously changing the level of the fluid in the sight gage in accordance with the movement of the movable member.

9. The combination as described in claim 8, further comprising a pin inserted into the member and in which the return means further includes a return spring enclosed in the first housing and arranged with the member so as to be between the pin and the shaft bearing so that as the member is moved towards the shaft by the moving means the spring is compressed and so that the spring returns the member to the reference position when the member is no longer urged against the shaft.

10. A method of measuring the wear of a ship's propeller shaft bearing comprises positioning a movable member at a reference position; moving the member until the member makes contact with the ship's propeller shaft, said moving step includes affixing a bottomless housing to the shaft bearing, said housing having a sealed upper opening through which the member passes and a port through which a fluid may enter or exit; affixing a diaphragm to said member, holding the diaphragm to the housin with a bezel ring forming thereby an expandable chamber, and the diaphragm being distended in the direction of the shaft so as to move the member into contact with the shaft, providing a supply of liquid, providing liquid from said supply to the expandable chamber, providing hydraulic means to determine the travel distance of the member from the reference position until the member is stopped by the shaft; and providing a measurment of the shaft bearing wear in accordance with the determined travel distance of the member.

11. A method as described in claim 10 further comprising inserting a pin into the member, and in which the returning step includes mounting a second housing on the first housing and having the movable member extending through it, and arranging a return spring with the member and between the pin and the first housing so that as the member is moved towards the shaft by the diaphragm the spring is compressed and so that the spring returns the member to the reference position.

12. A method as described in claim 11 in which the step of providing hydraulic means includes mounting a third housing having an opening, through which a liquid may enter or exit, on said second housing, in such manner so as to form a fixed chamber and so that the movable member extends into the fixed chamber, affixing a head element to the member, affixing a seal to the head element and contacting the sides of the third housing so as to seal off a lower portion of the fixed chamber from an upper portion of the fixed chamber, so as to allow fluid to enter the upper portion of the fixed chamber without entering the lower portion of the fixed chamber, connecting a sight gage by a line to the opening in the third housing and providing a predetermined quantity of liquid in the upper portion of the fixed chamber, in the line and in the sight gage so that as the member moves the level of the liquid in the sight gage changes accordingly.

13. A method as described in claim 12 further comprises providing a second opening in the third housing from the upper portion of the fixed chamber through the housing, and bleeding the fluid as necessary.

* * * * *